United States Patent
Cowburn et al.

(10) Patent No.: US 11,250,081 B1
(45) Date of Patent: Feb. 15, 2022

(54) PREDICTIVE SEARCH

(71) Applicant: Amazon Technologies, Inc., Seattle, WA (US)

(72) Inventors: Piers George Cowburn, London (GB); Eric Michael Molitor, London (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1058 days.

(21) Appl. No.: 14/495,100

(22) Filed: Sep. 24, 2014

(51) Int. Cl.
  *G06F 16/00* (2019.01)
  *G06F 16/9535* (2019.01)
  *G06F 16/2458* (2019.01)

(52) U.S. Cl.
  CPC ...... *G06F 16/9535* (2019.01); *G06F 16/2468* (2019.01)

(58) Field of Classification Search
  CPC .... G06F 16/245; G06F 16/435; G06F 16/735; G06F 16/2457; G06F 16/2468; G06F 16/9535; G06F 16/9536; G06F 16/90324
  USPC ........................................................ 707/780
  See application file for complete search history.

(56) References Cited

U.S. PATENT DOCUMENTS

| | | | | |
|---|---|---|---|---|
| 7,899,455 B2 * | 3/2011 | Ramer | ............... | G06Q 30/0247 455/432.3 |
| 8,166,026 B1 * | 4/2012 | Sadler | ................... | G06F 16/951 707/725 |
| 8,200,514 B1 * | 6/2012 | Crean | .................... | G06Q 10/02 705/5 |
| 8,209,618 B2 * | 6/2012 | Garofalo | ................. | A63F 13/23 715/753 |
| 8,229,873 B1 * | 7/2012 | Dolan | ................. | G06F 21/6218 706/45 |
| 8,301,639 B1 * | 10/2012 | Myllymaki | ......... | G06F 17/3097 707/748 |
| 8,364,709 B1 * | 1/2013 | Das | .................... | G06F 16/90335 707/780 |
| 8,712,218 B1 * | 4/2014 | Begeja | ................. | H04N 21/251 386/262 |
| 8,949,250 B1 * | 2/2015 | Garg | ....................... | H04L 67/10 707/748 |
| 9,037,598 B1 * | 5/2015 | Morton | ................. | G06F 16/162 707/767 |
| 9,201,861 B2 * | 12/2015 | Nishii | .................... | G06F 40/274 |
| 9,251,334 B1 * | 2/2016 | Molitor | ................... | G06F 21/10 |
| 9,292,622 B2 * | 3/2016 | Chandel | ............ | G06F 16/90324 |
| 9,378,456 B2 * | 6/2016 | White | .................... | G06N 7/005 |
| 9,384,266 B1 * | 7/2016 | Leicht | ..................... | G06F 16/35 |
| 9,471,671 B1 * | 10/2016 | Juang | .................... | G06F 16/285 |
| 9,524,077 B1 * | 12/2016 | Pattan | .................. | H04N 21/478 |
| 9,536,522 B1 * | 1/2017 | Hall | ......................... | G06N 5/02 |
| 9,582,535 B2 * | 2/2017 | Shartzer | .............. | G06F 11/3438 |
| 9,762,950 B1 * | 9/2017 | Cowburn | ........... | H04N 21/4316 |
| 9,824,232 B1 * | 11/2017 | Carmack | ................. | G06F 21/16 |
| 9,900,659 B1 * | 2/2018 | Norum | ................ | H04N 21/442 |

(Continued)

*Primary Examiner* — Ashish Thomas
*Assistant Examiner* — Rezwanul Mahmood
(74) *Attorney, Agent, or Firm* — Thomas | Horstemeyer, LLP

(57) ABSTRACT

Disclosed are various embodiments for a search query prediction service. User accounts are organized into various groupings. Candidate search queries are determined for the groups into which a user account is included. A predicted search query is selected from the candidate search queries and communicated to the client before an input of a portion of a search query by a user of the client.

20 Claims, 6 Drawing Sheets

(56) References Cited

U.S. PATENT DOCUMENTS

| | | | |
|---|---|---|---|
| 10,417,272 B1* | 9/2019 | Carmack | G06F 40/20 |
| 2003/0105589 A1* | 6/2003 | Liu | G06F 16/40 |
| | | | 702/1 |
| 2006/0069564 A1* | 3/2006 | Allison | G10L 15/08 |
| | | | 704/257 |
| 2007/0143262 A1* | 6/2007 | Kasperski | G06F 16/2425 |
| 2007/0233671 A1* | 10/2007 | Oztekin | G06F 16/9535 |
| 2007/0245882 A1* | 10/2007 | Odenwald | G11B 27/28 |
| | | | 84/609 |
| 2008/0117202 A1* | 5/2008 | Martinez | G06F 16/437 |
| | | | 345/418 |
| 2008/0195664 A1* | 8/2008 | Maharajh | H04N 21/6587 |
| 2009/0024546 A1* | 1/2009 | Ficcaglia | G06F 16/9535 |
| | | | 706/12 |
| 2009/0094196 A1* | 4/2009 | Piwowarski | G06F 16/954 |
| 2010/0169262 A1* | 7/2010 | Kenedy | G06F 16/9535 |
| | | | 706/50 |
| 2010/0169313 A1* | 7/2010 | Kenedy | G06F 16/9535 |
| | | | 707/736 |
| 2010/0169338 A1* | 7/2010 | Kenedy | G06F 16/9535 |
| | | | 707/758 |
| 2010/0169340 A1* | 7/2010 | Kenedy | G06Q 30/02 |
| | | | 707/758 |
| 2010/0169342 A1* | 7/2010 | Kenedy | G06F 16/9535 |
| | | | 707/758 |
| 2010/0169343 A1* | 7/2010 | Kenedy | G06F 16/9535 |
| | | | 707/758 |
| 2010/0250336 A1* | 9/2010 | Selinger | G06Q 30/0643 |
| | | | 705/26.7 |
| 2010/0280985 A1* | 11/2010 | Duchon | G06Q 10/10 |
| | | | 706/52 |
| 2010/0281012 A1* | 11/2010 | Imig | G06F 16/951 |
| | | | 707/708 |
| 2011/0010384 A1* | 1/2011 | Luo | G06Q 10/10 |
| | | | 707/769 |
| 2011/0022602 A1* | 1/2011 | Luo | G06F 16/24578 |
| | | | 707/748 |
| 2011/0022621 A1* | 1/2011 | Luo | G06Q 30/02 |
| | | | 707/769 |
| 2011/0055189 A1* | 3/2011 | Effrat | G06F 16/90324 |
| | | | 707/706 |
| 2011/0106743 A1* | 5/2011 | Duchon | G06F 16/35 |
| | | | 706/46 |
| 2011/0110565 A1* | 5/2011 | Jones | G16H 40/40 |
| | | | 382/128 |
| 2011/0314010 A1* | 12/2011 | Ganti | G06F 16/2425 |
| | | | 707/728 |
| 2012/0005019 A1* | 1/2012 | LeBlanc | G06Q 30/02 |
| | | | 705/14.53 |
| 2012/0030156 A1* | 2/2012 | Udink | G16H 50/30 |
| | | | 706/12 |
| 2012/0047005 A1* | 2/2012 | Connelly | G06Q 30/0254 |
| | | | 705/14.4 |
| 2012/0060176 A1* | 3/2012 | Chai | H04N 21/44204 |
| | | | 725/10 |
| 2012/0209705 A1* | 8/2012 | Ramer | G06Q 30/0269 |
| | | | 705/14.51 |
| 2012/0221687 A1* | 8/2012 | Hunter | G06F 16/435 |
| | | | 709/219 |
| 2012/0223889 A1* | 9/2012 | Medlock | G06F 3/04886 |
| | | | 345/168 |
| 2012/0278179 A1* | 11/2012 | Campbell | G06Q 30/0255 |
| | | | 705/14.69 |
| 2012/0291072 A1* | 11/2012 | Maddison | G06F 16/9537 |
| | | | 725/53 |
| 2013/0018960 A1* | 1/2013 | Knysz | H04L 65/403 |
| | | | 709/204 |
| 2013/0054552 A1* | 2/2013 | Hawkins | G06N 7/005 |
| | | | 707/706 |
| 2013/0212095 A1* | 8/2013 | Barad | G06F 16/93 |
| | | | 707/730 |
| 2013/0238540 A1* | 9/2013 | O'Donoghue | G06F 9/451 |
| | | | 706/46 |
| 2013/0238621 A1* | 9/2013 | Ganjam | G06F 16/2465 |
| | | | 707/737 |
| 2014/0006951 A1* | 1/2014 | Hunter | H04N 21/431 |
| | | | 715/719 |
| 2014/0037013 A1* | 2/2014 | Sato | H04N 19/187 |
| | | | 375/240.16 |
| 2014/0067826 A1* | 3/2014 | Jackson | G06F 16/337 |
| | | | 707/748 |
| 2014/0067935 A1* | 3/2014 | Hewinson | G06F 16/735 |
| | | | 709/204 |
| 2014/0164511 A1* | 6/2014 | Williams | G06Q 30/0277 |
| | | | 709/204 |
| 2014/0201126 A1* | 7/2014 | Zadeh | A61B 5/165 |
| | | | 706/52 |
| 2014/0259037 A1* | 9/2014 | Belyaev | H04N 21/44008 |
| | | | 725/14 |
| 2014/0259038 A1* | 9/2014 | Belyaev | H04N 21/4622 |
| | | | 725/14 |
| 2014/0279754 A1* | 9/2014 | Barsoum | G06N 20/00 |
| | | | 706/12 |
| 2014/0282656 A1* | 9/2014 | Belyaev | H04N 21/251 |
| | | | 725/14 |
| 2014/0289000 A1* | 9/2014 | Hutchings | G06Q 30/0201 |
| | | | 705/7.29 |
| 2014/0316930 A1* | 10/2014 | Jain | G06Q 30/0631 |
| | | | 705/26.5 |
| 2014/0351234 A1* | 11/2014 | Maddison | G06F 16/9032 |
| | | | 707/706 |
| 2014/0379462 A1* | 12/2014 | Rangarajan | G06Q 30/0254 |
| | | | 705/14.46 |
| 2015/0020106 A1* | 1/2015 | Belyaev | H04N 21/458 |
| | | | 725/45 |
| 2015/0181289 A1* | 6/2015 | Wheatley | H04N 21/44222 |
| | | | 725/14 |
| 2015/0206221 A1* | 7/2015 | Kendrick | G06Q 30/0631 |
| | | | 705/26.7 |
| 2015/0234820 A1* | 8/2015 | Aravamudan | H04N 21/4668 |
| | | | 707/769 |
| 2015/0294595 A1* | 10/2015 | Hu | G06Q 10/101 |
| | | | 434/127 |
| 2015/0302301 A1* | 10/2015 | Petersen | G06Q 10/107 |
| | | | 706/11 |
| 2015/0339754 A1* | 11/2015 | Bloem | G06F 16/9535 |
| | | | 705/26.7 |
| 2015/0365725 A1* | 12/2015 | Belyaev | H04N 21/8133 |
| | | | 725/46 |
| 2016/0012135 A1* | 1/2016 | Wang | G11C 14/0018 |
| | | | 707/731 |
| 2016/0063118 A1* | 3/2016 | Campbell | G06F 16/9535 |
| | | | 707/722 |
| 2016/0078471 A1* | 3/2016 | Hamedi | H04L 67/1072 |
| | | | 705/14.41 |
| 2017/0201779 A1* | 7/2017 | Publicover | H04N 21/4532 |
| 2021/0019843 A1* | 1/2021 | Dildy | G06Q 30/0241 |

* cited by examiner

PREDICTIVE SEARCH

BACKGROUND

Users may access content by submitting a search query, even when such content is otherwise accessible. For example, a user may have access to selections of media content such as a queue, playlist, media library, or other selection. When accessing a media distribution service, a user may input a search query to access desired content instead of accessing the same content from these selections. Inputting the search query may require more effort on input on the part of the user when compared to accessing a selection of content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
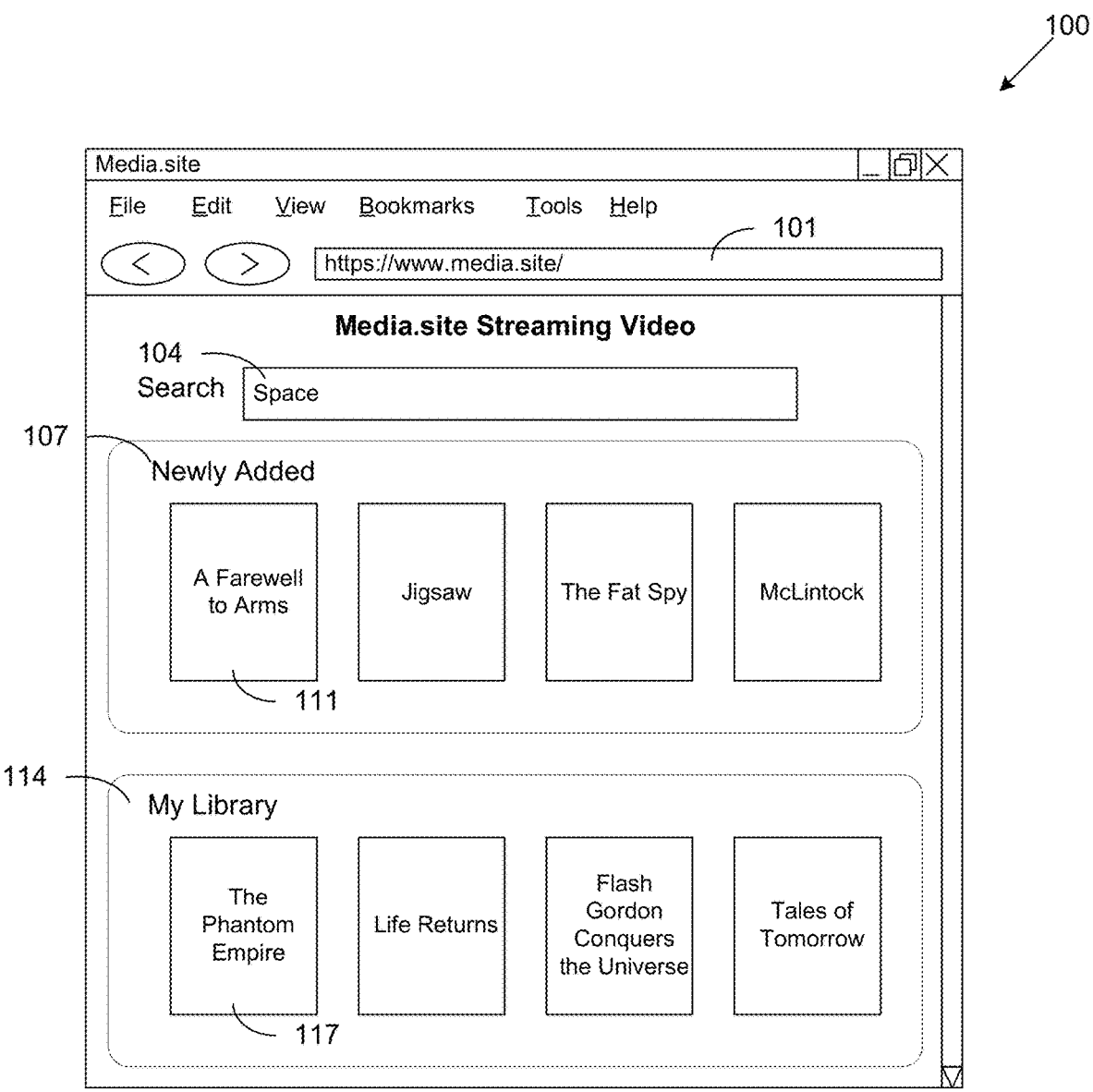
FIG. 1 is an example scenario of content generated a media distribution service according to various embodiments of the present disclosure.

Media distribution services or other services may implement various approaches to facilitate the access to content by users. For example, a media distribution service may implement a search service, allowing a user to input a search query directed towards desired content. The search service would then communicate a selection of media items responsive to the input search query to the user. As another example, a media distribution service may maintain lists or selections of media content in association with a user account. Such selections may include a queue or list of media items maintained for future consumption. Such selections may also include a library of purchased, rented, leased, or otherwise associated media items.

Some users having access to these selections of media items may still preferentially discover content by search. As a non-limiting example, a user may have purchased a subscription or season pass to a television show, allowing access to each episode in a season as they are released. After a new episode is released, the user may access the media distribution service to watch the latest episode. Although the latest episode may appear in a media library of the user, as they have previously purchased the entire season, the user may still search for the show in order to view the latest episode.

In some embodiments, inputting a search query may require more input actions or effort on the part of the user when compared to accessing a selection or grouping of media items. For example, selecting a media library may only require a few input actions to select one or a series of navigation aids directed to the media library. In contrast, inputting a search query may require many inputs to both navigate towards and select a character of the search query. If the media distribution service is being accessed using an input device such as a remote control or game pad, this may require many inputs on the part of the user to navigate a cursor around a plane of characters or virtual keyboard in order to select each individual character.

A prediction service determines a search query likely to be input by a user accessing the media distribution service. Upon accessing a network page or other content served by the media distribution service, the prediction service encodes the predicted search query for presentation to the user. For example, the prediction service may populate a search input field with the predicted search query. This allows for the user to search the media distribution service using the predicted search query without additional input from the user. The predicted search query may be determined according to one or more groupings into which a user may be included. The predicted search query may also be determined according to recent events, media releases, search histories, media consumption histories, or other data.

In the following discussion, a general description of the system and its components is provided, followed by a discussion of the operation of the same. Although the following discussion is presented with respect to searching for media items in a media distribution service, it is understand that the approaches set forth below may be applied to other contexts, such as searching for items in an electronic commerce system.

With reference to FIG. 1, shown is an example scenario of a user interface 100 encoded for rendering by a media distribution service according to various embodiments of the present disclosure. Item 101 is a Uniform Resource Locator (URL) directed to content served by the media distribution service. Item 104 is an input field to facilitate the input of a search query by a user. In this example scenario, upon rendering the user interface 100, the input field of item 104 is prepopulated with a search query "Space." This would allow a user to search for media items matching the search query "space" without requiring the manual input of the search query. Item 107 is a user interface element corresponding to a selection of newly added media items, represented by item 111. Item 114 is a user interface element corresponding to a selection of media items in a media library of a user. Such media items are represented by item 117.

Figure 2:
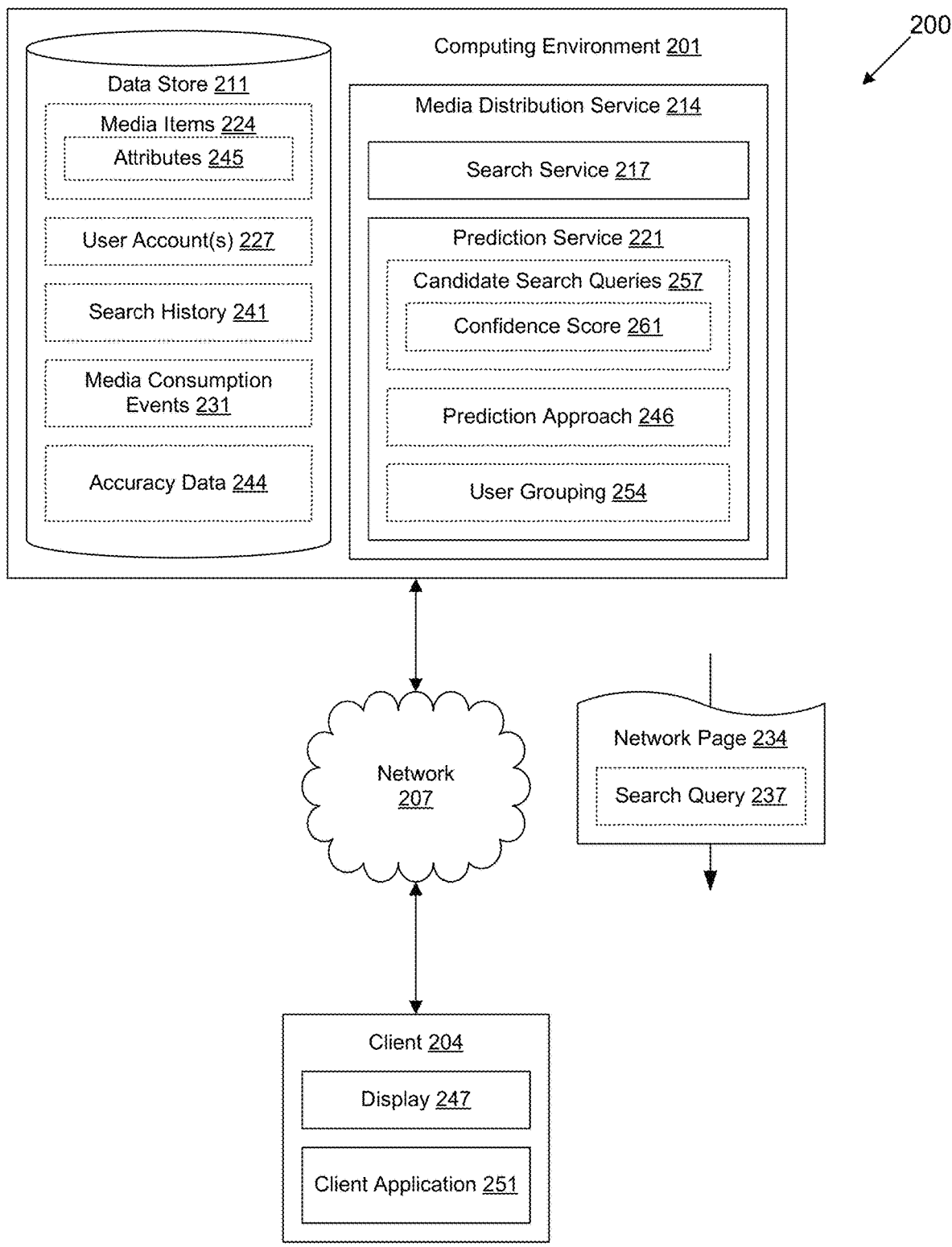
FIG. 2 is a drawing of a networked environment according to various embodiments of the present disclosure.

Moving on to FIG. 2, shown is a networked environment 200 according to various embodiments. The networked environment 200 includes a computing environment 201, and a client 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include a media distribution service 214 having a search service 217 and prediction service 221, and other applications, services, processes, systems, engines, or functionality not discussed in detail herein. The media distribution service 214 is executed to facilitate the distribution of media items 224 to clients 204 via the network 207. To this end, the media distribution service 214 may be configured to facilitate the download or streaming of media items 224 by clients 204. The media distribution service 214 may be further configured to encode, decode, compress, or otherwise transform media items 224 for communication to clients 204. Additionally, the media distribution service 214 may be configured to process payment instruments such as credit cards, prepaid accounts, or other payment instruments to consummate financial transactions for access to the media distribution service 214 or the distribution of media items 224. The media distribution service 214 may also be configured to maintain user accounts 227 and media consumption events 231, as will be described in further detail below. Additionally, the media distribution service 214 may be configured to encode data such as network pages 234 for rendering by a client 204 to facilitate interactions by the client 204 with the media distribution service 214. Such network pages 234 may include, for example, user interfaces to facilitate navigating a catalog of media items 224, maintaining selections of media items 224 such as queues, libraries, or other selections, embedded or otherwise encoded media players, or other data. The media distribution service 214 may also be configured to perform additional operations.

The search service 217 is configured to apply a search query 237 to a catalog of media items 224 accessible to the media distribution service 214 in order to select those media items 224 responsive to the search query 237. The selection of media items 224 responsive to the search query 237 may be encoded as search results in a network page 234 served by the media distribution service 214 to the client 204 via the network 207.

The prediction service 221 is executed to select a search query 237 likely to be input by a user of a client 204 accessing the media distribution service 214. This allows the predicted search query 237 to be encoded in a network page 234 communicated to the client 204 before a client 204 inputs a portion of a search query 237 to be submitted to the search service 217. By including the predicted search query 237 in the network page 234 communicated to the client 204, the user of the client 204 may immediately submit the predicted search query 237 to the search service 217 with minimal or no additional character input.

The data stored in the data store 211 includes, for example, media items 224, user accounts 227, a search history 241, media consumption events 231, accuracy data 244, and potentially other data. Media items 224 are representative of media accessible for distribution by the media distribution service 214 to clients 204. Media items 224 may include, for example, audio items, video items, audiovisual items, eBooks, text items, images, or other media as can be appreciated. Media items 224 may be associated with various attributes 245 facilitating a search or classification of respective media items 224. For example, such attributes 245 may include a category, subcategory, genre, taxonomy node, or other classification of the media item 224. Such attributes 245 may also include indications of creators, distributors, contributors, or other personnel associated with a respective media item 224. Attributes 245 may also include other data associated with a media item 224 as can be appreciated.

User accounts 227 comprise data associated with one or more customers of the media distribution service 214. User accounts 227 may comprise, for example, login information such as usernames or passwords to authenticate a customer attempting to access the media distribution service 214. The user accounts 227 may also comprise contact information such as a mailing address, email address, phone number or other contact information. Additionally, the user accounts 227 may comprise data representing payment instruments used to consummate an order with the media distribution service 214, including credit cards, debit cards, banking accounts, prepaid accounts, or other payment instruments. User accounts 227 may also comprise user preferences embodying settings, configurations, or other preferences used in interactions with the media distribution service 214 as will be described below. Additionally, user accounts 227 may indicate demographic data such as sex, gender, family composition, or other data for one or more users associated with the user accounts 227.

A search history 241 indicates search queries 237 previously submitted to the search service 217 by clients 204. The search history 241 may also include temporal or location data indicating a context in which a search query 237 was submitted. Additionally, the search history 241 may indicate one or more user accounts 227 associated with a client 204 submitting a search query 237. The search history 241 may also include other data.

Media consumption events 231 indicate a past consumption of a media item 224 by a client 204 via the media distribution service 214. Consumption may include a streaming, downloading, encoding, purchase, rental, sale, or other action taken with respect to a media item 224. The media consumption events 231 may include temporal or location data indicating a context in which a media item 224 was consumed. Additionally, the media consumption events 231 may indicate one or more user accounts 227 associated with a client 204 consuming a media item 224. The media consumption events 231 may also include other data.

Accuracy data 244 indicates an accuracy of a prediction approach 246 implemented by the prediction service 221 in predicting a search query 237. The accuracy may be determined according to a comparison between a predicted search query 237 and a search query 237 subsequently submitted by a client 204 to the search service 217. Generating and updating accuracy data 244 will be described in further detail below with respect to the operations of the prediction service 221.

The client 204 is representative of a plurality of client devices that may be coupled to the network 207. The client 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 204 may include a display 247. The display 247 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 204 may be configured to execute various applications such as a client application 251 and/or other applications. The client application 251 may be executed in a client 204, for example, to access network content served up by the computing environment 201 and/or other servers, thereby rendering a user interface on the display 247. To this end, the client application 251 may comprise, for example, a browser, a dedicated application, etc., and the user interface may comprise a network page, an application screen, etc. The client 204 may be configured to execute applications beyond the client application 251 such as, for example, email applications, social networking applications, word processors, spreadsheets, and/or other applications.

Next, a general description of the operation of the various components of the networked environment 200 is provided. To begin, a client 204 accesses the media distribution service 214 via the network 207. This may include communicating a request to the media distribution service 214 to request a network page 234 corresponding to a starting page, a landing page, or other network page 234 at the beginning of a media consumption pipeline. In response to the request, the media distribution service 214 accesses the prediction service 221 to determine a predicted search query 237 likely to be submitted by the user of the client 204 to the search service 217.

To determine the predicted search query 237, the prediction service 221 may determine one or more user groupings 254 into which a user account 227 associated with the client 204 is included. User groupings 254 are collections or groups of one or more user accounts 227. In some embodiments, the prediction service 221 may dynamically generate the user groupings 254 by applying a clustering analysis to user accounts 227 according to various data or attributes the user accounts 227. In other embodiments, the prediction service 221 may apply a rules-based approach to this data or attributes to classify user accounts 227 into user groupings 254.

The data or attributes accessed by the prediction service 221 to determine the user groupings 254 may comprise data or attributes included in or otherwise associated with user accounts 227, such as demographic data, location data, or other data. Additionally, user groupings 254 may be determined according to preferences, habits, trends, or other patterns indicated in media consumption events 231 corresponding to the respective user accounts 227. For example, user accounts 227 may be grouped into user groupings 254 according to preferences for attributes 245 of media items 224, such as genre preferences, personnel preferences (e.g. preferences for actors, directors, musicians, writers, or other contributors), content length, content format such as movies or television shows, or other attributes 245. User accounts 227 may also be grouped according to a context in which media items 224 are consumed as indicated in media consumption events 231. A media consumption context may indicate, for example, a device or device type used to consume the media item 224, a time at which the media item 224 is consumed, a location at which the media item 224 is consumed, or other criteria. Determining user groupings 254 may include first determining preferences for each of the user accounts 227 as described above. The prediction service may then group the user accounts 227 into the user groupings 254 by applying a clustering approach, a rules-based approach, or other approach to the determined preferences. Determining user groupings 254 may also be performed by another approach.

Next, the prediction service 221 determines into which of the user groupings 254 a user account 227 associated with the client 204 is included. The prediction service 221 determines selections of candidate search queries 257 for each of the user groupings 254 into which the user account 227 associated with the client 204 is included. Candidate search queries 257 are those search queries 237 from which a predicted search query 237 may be selected.

Candidate search queries 257 may be selected according to a search history 241 with respect to the user groupings 254, according to attributes 245 indicated as preferred by the user groupings 254, as a function of reported events, media item 224 release date recency, as a function of purchase, rental, or access rates with respect to user groupings 254, or by another approach. Such approaches for selecting candidate search queries 257 will be described in further detail below.

In some embodiments, the prediction service 221 may filter or otherwise limit the candidate search queries 257 according to an input vector of a client 204. For example, a client 204 may be configured to render a virtual keyboard or plane of characters from which a user may select a character as a portion of a search query 237. This may include rendering a cursor or other selection element to facilitate the selection of a character. The direction of movement of the cursor or selection element, hereinafter referred to as an input vector, may be used to limit the potential starting characters of a candidate search query 257. For example, a virtual keyboard may render a plane of characters corresponding to a QWERTY keyboard. An input to a client 204 may direct a cursor to move right, from the "R" character to the "T" character. This would indicate that the user intends to input a search query 237 starting with one of the characters in line with or to the right of the "T" character. As the movement of the cursor is directed to the right, the prediction service 221 may exclude those candidate search queries 257 starting with a character to the left of the current cursor position. Similarly, an input vector may also include a direction of eye movement determined by eye-tracking performed in the client 205. An input vector may also include a direction of movement of an input device such as a mouse, stylus, or finger. In embodiments implementing input vectors, the client 204 may be configured to communicate an input vector or a current input position to the prediction service 221, requesting an update to a predicted search query 237 or candidate search queries 257 based on the input vector or position. Candidate search queries 257 may also be filtered according to an input vector by another approach.

After selecting the candidate search queries 257, the prediction service 221 calculates confidence scores 261 for the candidate search queries 257. This may include, for example, calculating a confidence score 261 as a function of an inclusion of the candidate search query 257 in a search history 241 with respect to the user grouping 254. This may include a search rate, a search frequency, an overall search amount, or other value associated with the candidate search query 257. Confidence scores 261 may also be calculated according to an association with a reported event. For example, a candidate search query 257 may have an increased confidence score 261 if it is a name of a recently deceased individual, a title of a work contributed by a recently deceased individual, a title or individual associated with a recently released work, or by another approach. Confidence scores 261 may be calculated according to similar approaches or as a function of similar data as is used to select the candidate search queries 257 as will be described in detail below.

The prediction service 221 may implement a variety of prediction approaches 246 defining how candidate search queries 257 are selected, how confidence scores 261 are calculated, or other processes. For example, a prediction approach 246 may indicate which data is to be used as a basis for selecting candidate search queries 257 or calculating confidence scores 261. As another example, confidence scores 261 may be calculated using weighted values corresponding to relevant data points. The prediction approaches 246 may define what weights are to be applied to the respective values. In embodiments in which the prediction service 221 implements multiple prediction approaches 246, the prediction approach 246 to be used for selecting the predicted search query 237 may be determined according to an accuracy of the prediction approach 246 indicated in corresponding accuracy data 244. Approaches for defining and updating accuracy data 244 will be described in detail below.

After calculating the confidence scores 261 for the candidate search queries 257 of the user groupings 254, the prediction service 221 selects one of the candidate search queries 257 as a predicted search query 237. This may include, for example, selecting one of the candidate search queries 257 having a highest confidence score 261 with respect to others of the candidate search queries 257. This may also include, for example, calculating a standard deviation of the confidence scores 261 with respect to other confidence scores 261 for candidate search queries 257 of the same user grouping 254. The prediction service 221 may then select the search query 237 as the one of the candidate search queries 257 having a confidence score 261 with a highest standard deviation.

In embodiments in which the prediction service 221 calculates confidence scores 261 according to multiple prediction approaches 246, the prediction service 221 may select a predicted search query 237 according to aggregated confidence scores 261. For example, if more than one prediction approaches 246 is used to calculate confidence scores 261 for a particular search query 237, the prediction service 237 may select a predicted search query 237 according to a total, average, or other confidence score 261 value aggregated across the prediction approaches 246. The prediction service 221 may also select the predicted search query 237 by another approach.

The prediction service 221 then encodes the predicted search query 237 for communication to the client 204 before an input of a portion of a search query 237 by a user of the client 204. This may include, for example, encoding a network page 234 with a navigation aid or link that, when selected, initiates a submission of the predicted search query 237 to the search service 217. This may also include, for example, populating an input field such as a text input with the predicted search query 237. As the predicted search query 237 is communicated to the client 204 before an input of a portion of a search query 237 by a user of the client 204, the predicted search query 237 may be included in, for example, a start page, home page, search page, or other network page 234 at the beginning of a content access pipeline or process. The predicted search query 237 may also be communicated to the client 204 by another approach.

Figure 3:
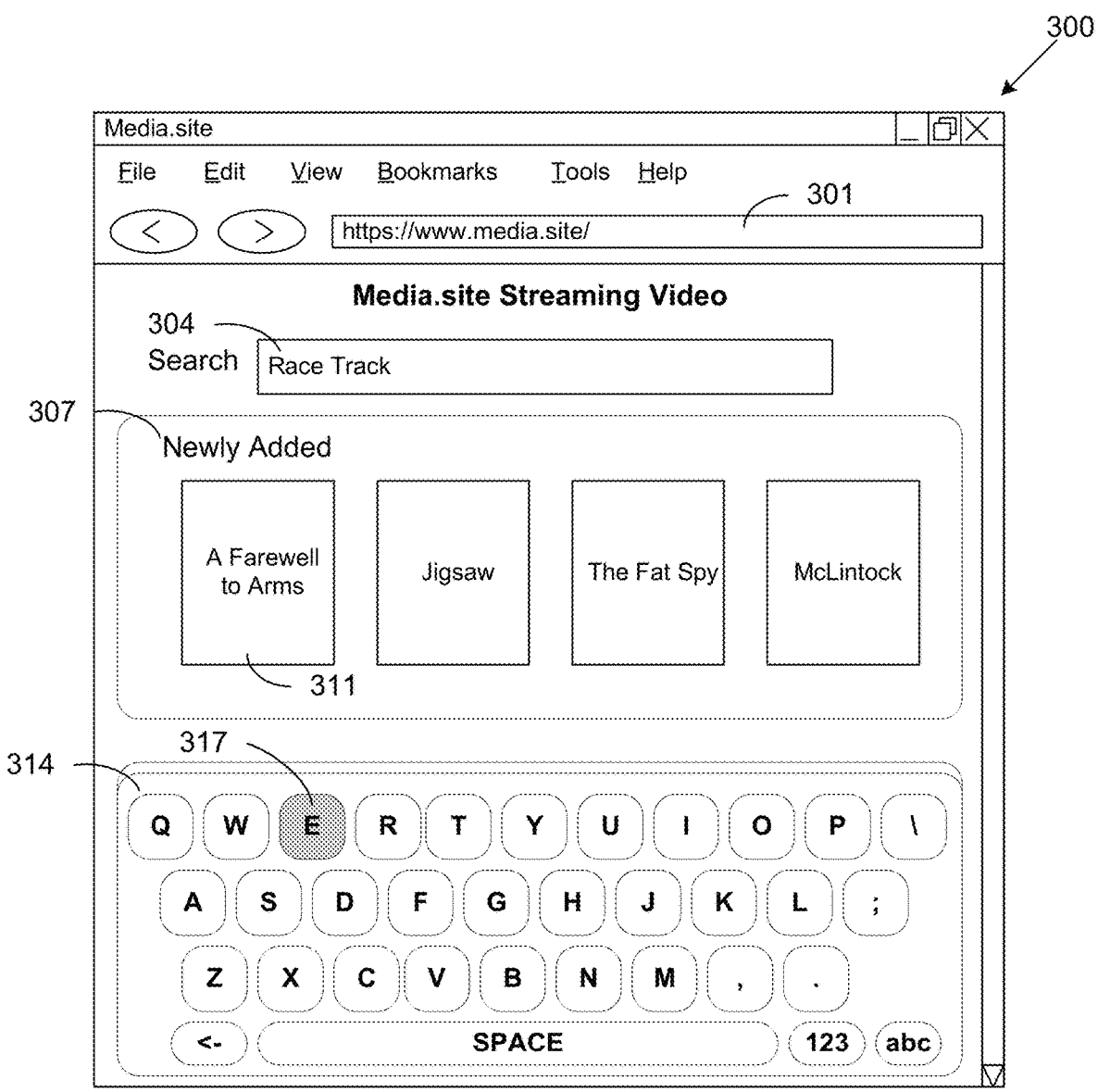
FIG. 3 is a pictorial diagram of an example user interface rendered by a client in the networked environment of FIG. 2 according to various embodiments of the present disclosure.

Turning next to FIG. 3, shown is an example user interface 300 encoded for rendering by the client 204 (FIG. 2). In some embodiments, the user interface 300 may correspond to a network page 234 (FIG. 2) served by the computing environment 201 (FIG. 2) for rendering by a browser client application 251 (FIG. 1). In other embodiments, the user interface 300 may correspond to data encoded for rendering by a dedicated client application 251.

Item 301 is a Uniform Resource Locator (URL) directed to content served by the media distribution service 214 (FIG. 2). Item 304 is an input field to facilitate the input of a search query 237 (FIG. 2) by a user of the client 204. Item 307 is a user interface element corresponding to a selection of newly added media items, represented by item 311. Item 314 is a virtual keyboard to facilitate the selection of characters as a portion of a search query 237. Item 317 is a highlighted character, selected according to a right-directed input vector. As the input vector is to the right, the prediction service 221 would exclude from the candidate search queries 257 (FIG. 2) those candidate search queries beginning with a character to the left of the highlighted character of item 317 in the virtual keyboard of item 314. Accordingly, the input field of item 304 is populated with a search query 237 "Race Track" that begins with the character "R," located to the right of item 317.

Figure 4:
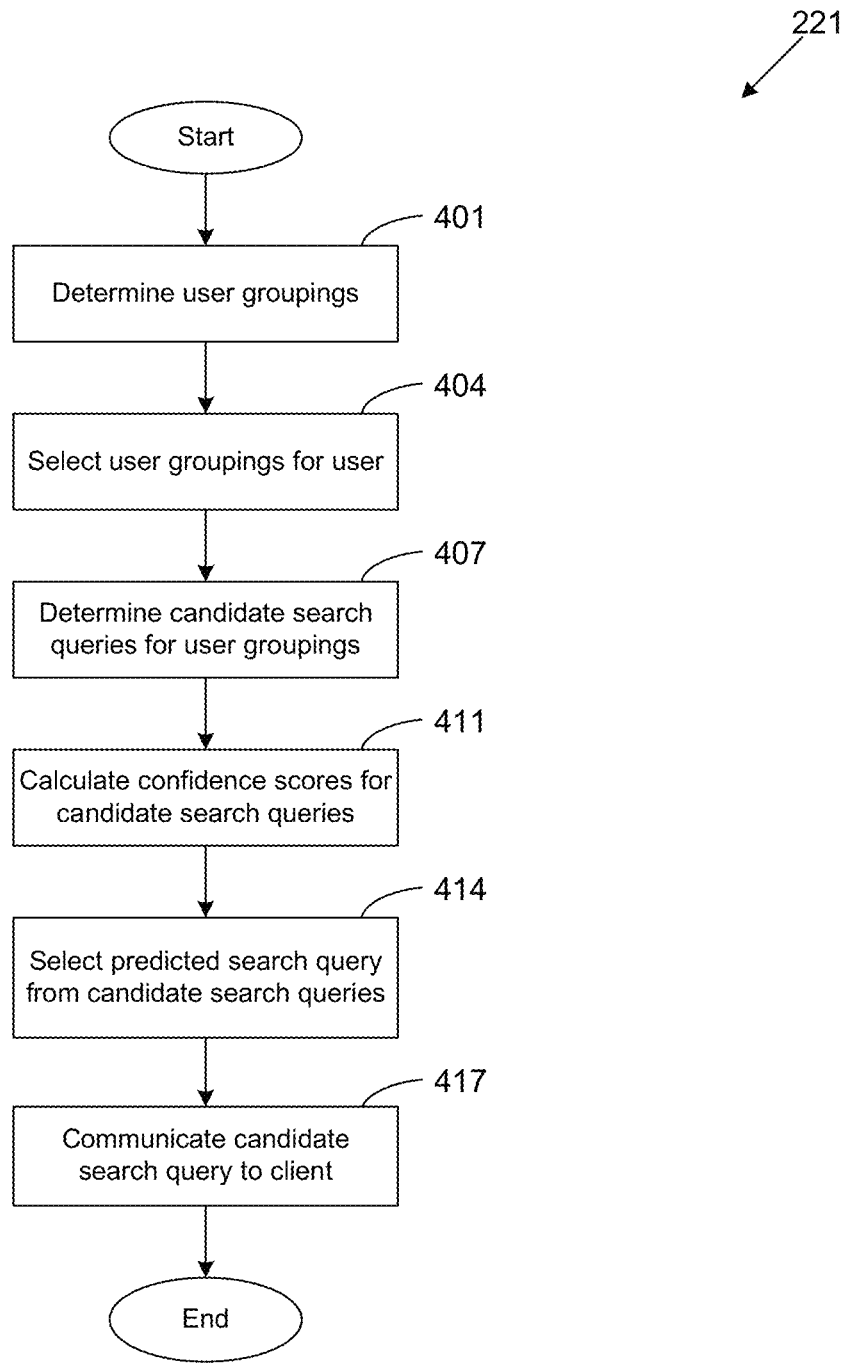
FIGS. 4-5 are flowcharts illustrating one example of functionality implemented as portions of a prediction service executed in a computing environment in the networked environment of FIG. 2 according to various embodiments of the present disclosure.

Referring next to FIG. 4, shown is a flowchart that provides one example of the operation of a portion of the prediction service 221 according to various embodiments. It is understood that the flowchart of FIG. 4 provides merely an example of the many different types of functional arrangements that may be employed to implement the operation of the portion of the prediction service 221 as described herein. As an alternative, the flowchart of FIG. 4 may be viewed as depicting an example of elements of a method implemented in the computing environment 201 (FIG. 2) according to one or more embodiments.

Beginning with box 401, the prediction service 221 determines user groupings 254 (FIG. 2) for user accounts 227 (FIG. 2) of the media distribution service 214 (FIG. 2). In some embodiments, the prediction service 221 may dynamically generate the user groupings 254 by applying a clustering analysis to user accounts 227 according to various data or attributes the user accounts 227. In other embodiments, the prediction service 221 may apply a rules-based approach to this data or attributes to classify user accounts 227 into user groupings 254.

The data or attributes accessed by the prediction service 221 to determine the user groupings 254 may comprise data or attributes included in or otherwise associated with user accounts 227, such as demographic data, location data, or other data. Additionally, user groupings 254 may be determined according to preferences, habits, trends, or other patterns indicated in media consumption events 231 (FIG. 2) corresponding to the respective user accounts 227. For example, user accounts 227 may be grouped into user groupings 254 according to preferences for attributes 245 (FIG. 2) of media items 224 (FIG. 2), such as genre preferences, personnel preferences (e.g. preferences for actors, directors, musicians, writers, or other contributors), content length, content format such as movies or television shows, or other attributes 245. User accounts 227 may also be grouped according to a context in which media items 224 are consumed as indicated in media consumption events 231. A media consumption context may indicate, for example, a device or device type used to consume the media item 224, a time at which the media item 224 is consumed, a location at which the media item 224 is consumed, or other criteria. Determining user groupings 254 may include first determining preferences for each of the user accounts 227 as described above. The prediction service may then group the user accounts 227 into the user groupings 254 by applying a clustering approach, a rules-based approach, or other approach to the determined preferences. Determining user groupings 254 may also be performed by another approach.

Next, in box 404, the prediction service 221 determines into which of the user groupings 254 a user account 227 associated with the client 204 (FIG. 2) is included. The prediction service 221 then determines, for each of the user groupings into which the user account 227 associated with the client 204 is included, a collection or listing of candidate search queries 257 (FIG. 2).

Candidate search queries 257 may be selected according to a search history 241 (FIG. 2) with respect to the user groupings 254. This may include, for example, selecting those search queries 237 having a highest frequency of submission in association with included user accounts 227. This may be determined with respect to a predefined time period, or another approach. This may also include, for example, selecting those search queries 237 having an increased rate or increased frequency of submission, indicating a current popularity or relevance of the respective search query 237. Candidate search queries 257 may also be determined from a search history 241 by another approach.

The prediction service 221 may also determine candidate search queries 257 according to reported events. For example, an event may include the death or other life event for an actor or another individual. The name of the individual, works associated with the individual, or other relevant text may be included as a candidate search query 257. As another example of a reported event, a new media release external to the media distribution service 214 may affect the search habits with respect to the media distribution service 214. For example, a newly released movie for a franchise or featuring a particular contributor may increase the likelihood of searches for media items 224 in the franchise or featuring that contributor. The predictions service 221 may access these reported events for determining candidate search queries 257 by accessing a data feed for receiving events, parsing one or more network pages such as news sources, determining updates or changes to biographical information in network pages or other data repositories, or by another approach.

Candidate search queries 257 may also be determined according to attributes 245 (FIG. 2) of media items 224 indicated as preferential for user accounts 227. For example, if a user grouping 254 indicates a preference for a particular genre or contributor, a name or title of that genre or contributor may be included in a candidate search query 257.

Selecting candidate search queries 257 may be performed according to criteria, rules, algorithms, or approaches defined in a prediction approach 246 (FIG. 2). In such an embodiment, generating the candidate search queries 257 may include selecting a prediction approach 246 having a highest accuracy with respect to others of the prediction approaches 246 as indicated in accuracy data 244 (FIG. 2). Determining candidate search queries 257 may also be performed by another approach.

Next, in box 411, the prediction service 221 calculates confidence scores 261 (FIG. 2) for the candidate search queries 257. This may be performed according as a function of weights defined in a selected prediction approach 246, as a function of data indicated in a selected prediction approach 246, or otherwise in accordance with a selected prediction approach 246. This may include, for example, calculating a confidence score 261 as a function of an inclusion of the candidate search query 257 in a search history 241 with respect to the user grouping 254. Confidence scores 261 may also be included according to a degree of association or a degree of inclusion in a reported event, such as an inclusion in a parsed network page 234 (FIG. 2), news feed, data feed, or other information source. Additionally, confidence scores 261 may be calculated according to a number of candidate search queries 257 in a selection of candidate search queries 257 for a given user grouping 254. For example, a candidate search query 257 may have a higher confidence score 261 if there are fewer other candidate search queries 257 in the same selection. Confidence scores 261 may also be calculated according to other approaches as can be appreciated.

After calculating the confidence scores 261 for the candidate search queries 257 of the user groupings 254, the process advances to box 414 where the prediction service 221 selects one of the candidate search queries 257 as a predicted search query 237. This may include, for example, selecting one of the candidate search queries 257 having a highest confidence score 261 with respect to others of the candidate search queries 257. This may also include, for example, calculating a standard deviation of the confidence scores 261 with respect to other confidence scores 261 for candidate search queries 257 of the same user grouping 254. The prediction service 221 may then select the search query 237 as the one of the candidate search queries 257 having a confidence score 261 with a highest standard deviation. The prediction service 221 may also select the predicted search query 237 by another approach.

Next, in box 417, the prediction service 221 then encodes the predicted search query 237 for communication to the client 204 before an input of a portion of a search query 237 by a user of the client 204. This may include, for example, encoding a network page 234 with a navigation aid or link that, when selected, initiates a submission of the predicted search query 237 to the search service 217. This may also include, for example, populating an input field such as a text input with the predicted search query 237. The predicted search query 237 may also be communicated to the client 204 by another approach.

Figure 5:
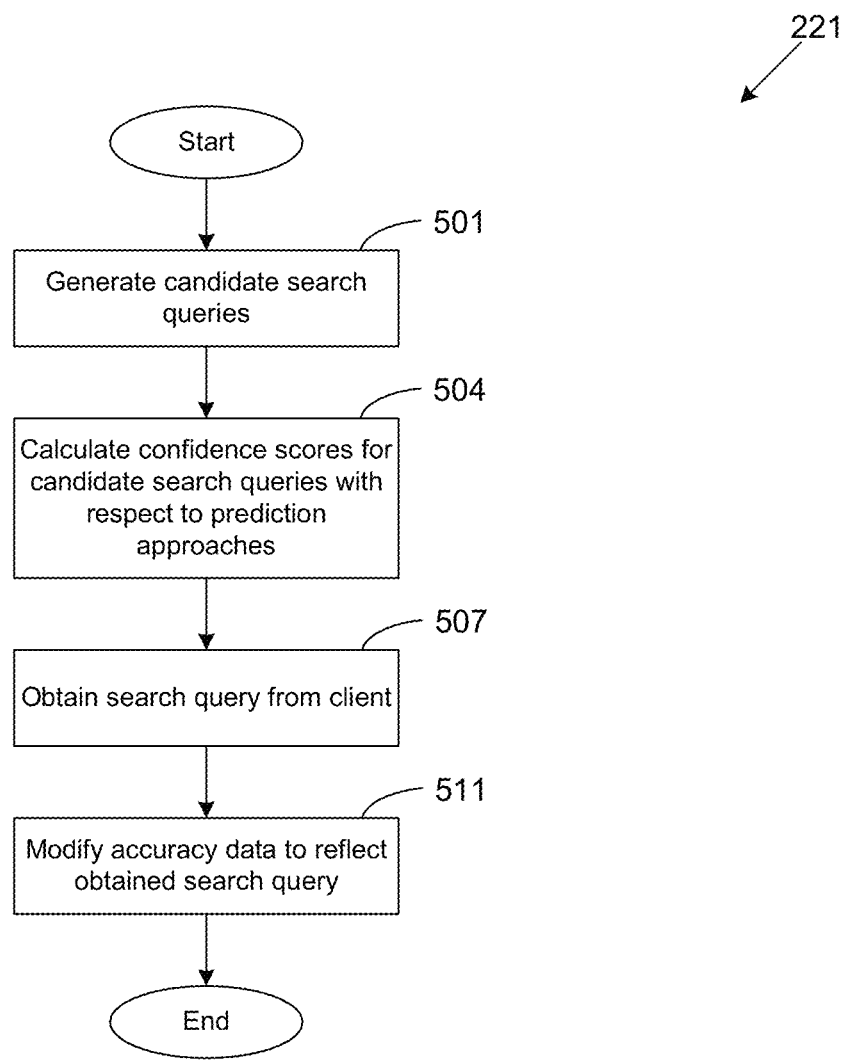

Moving on to FIG. 5, shown is a flowchart that provides one example of the operation of a portion of the prediction service 221 according to various embodiments. It is understood that the flowchart of FIG. 5 provides merely an example of the many different types of functional arrangements that may be employed to implement the operation of the portion of the prediction service 221 as described herein. As an alternative, the flowchart of FIG. 5 may be viewed as depicting an example of elements of a method implemented in the computing environment 201 (FIG. 2) according to one or more embodiments. The flowchart of FIG. 5 describes a process for updating accuracy data 244 (FIG. 2) for prediction approaches 246 (FIG. 2) in order to maintain data reflecting the accuracy of the prediction approaches 246.

Beginning with box 501, the prediction service 221 generates candidate search queries 257 (FIG. 2) with respect to user groupings 254 (FIG. 2) into which a user account 227 (FIG. 2) is included. This may be performed according to an approach as described above, or by another approach. Next, in box 504, the prediction service 221 calculates confidence scores 261 (FIG. 2) for the candidate search queries 257 using each of multiple prediction approaches 246. This results in each of the candidate search queries 257 having a confidence score 261 for each of the used prediction approaches 246.

Next, in box 507, the prediction service 221 obtains a search query 237 (FIG. 2) submitted by a client 204 (FIG. 2) to the search service 217 (FIG. 2) in order to search the catalog of media items 224 (FIG. 2) accessible to the media distribution service 214 (FIG. 2). In some embodiments, this may be performed after communicating a predicted search query 237 as described above. For example, a prediction service 221 may have selected a predicted search query 237 according to the confidence scores 261 of a selected one of the prediction approaches 246, but the confidence scores 261 are calculated for the non-selected prediction approaches 246 so that their corresponding accuracy data 244 may also be updated. In other embodiments, this may be performed independent of a communication of a predicted search query 237 to a client 204, such as in an algorithm training process.

In box 511, the prediction service modifies accuracy data 244 for each of the prediction approaches 246 for which confidence scores 261 were calculated to reflect the search query 237 obtained from the client 204. Each of the prediction approaches 246 would indicate a search query 237 that would have been selected were the prediction service 221 to select the respective prediction approach 246, as described above. The prediction service 221 may then compare the search query 237 obtained from the client 204 to those search queries 237 that would be indicated as predicted search queries 237 according to the various prediction approaches. This may include applying a string similarity algorithm, or another approach as can be appreciated. Modifying the accuracy data 244 for a respective prediction approach 246 may then include indicating a higher accuracy if the predicted search query 237 matches the obtained search query 237, has a string similarity meeting or exceeding a threshold, or satisfying other criteria. Modifying the accuracy data 244 for a respective prediction approach 246 may also include indicating a lower accuracy if the predicted search query 237 fails to match the obtained search query 237, has a string similarity falling below a threshold, or failing to satisfy other criteria. Accuracy data 244 may also be modified according to another approach.

Figure 6:
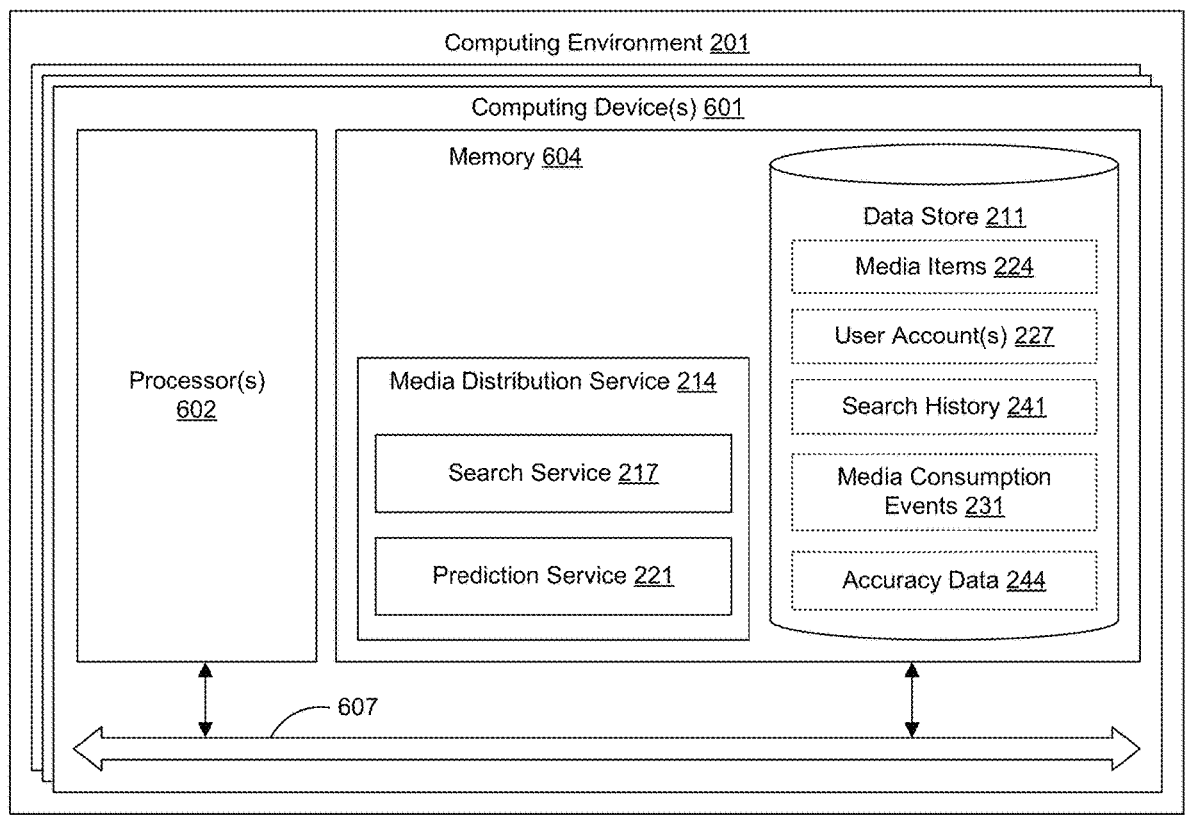
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 201 according to an embodiment of the present disclosure. The computing environment 201 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are a media distribution service 214 having a search service 217 and prediction service 221, and potentially other applications. Also stored in the memory 604 may be a data store 211 storing media items 224, user accounts 227, search history 241, media consumption events 231, accuracy data 244 and other data. In addition, an operating system may be stored in the memory 604 and executable by the processor 602.

It is understood that there may be other applications that are stored in the memory 604 and are executable by the processor 602 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 and are executable by the processor 602. In this respect, the term "executable" means a program file that is in a form that can ultimately be run by the processor 602. Examples of executable programs may be, for example, a compiled program that can be translated into machine code in a format that can be loaded into a random access portion of the memory 604 and run by the processor 602, source code that may be expressed in proper format such as object code that is capable of being loaded into a random access portion of the memory 604 and executed by the processor 602, or source code that may be interpreted by another executable program to generate instructions in a random access portion of the memory 604 to be executed by the processor 602, etc. An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 may represent multiple processors 602 and/or multiple processor cores and the memory 604 may represent multiple memories 604 that operate in parallel processing circuits, respectively. In such a case, the local interface 607 may be an appropriate network that facilitates communication between any two of the multiple processors 602, between any processor 602 and any of the memories 604, or between any two of the memories 604, etc. The local interface 607 may comprise additional systems designed to coordinate this communication, including, for example, performing load balancing. The processor 602 may be of electrical or of some other available construction.

Although the prediction service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the prediction service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the prediction service 221, that comprises software or code can be embodied in any non-transitory computer-readable medium for use by or in connection with an instruction execution system such as, for example, a processor 602 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the prediction service 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 601, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one hardware computing device, wherein, when executed, the program causes the at least one hardware computing device to at least:
   classify a user account into at least one of a plurality of groups based at least in part on at least one media consumption event associated with the user account, the at least one media consumption event comprising location data indicating a context in which at least one respective media item was consumed, the at least one of the plurality of groups comprising a plurality of user accounts;
   select one of a plurality of prediction approaches based at least in part on accuracy data indicating an accuracy of respective ones of the plurality of prediction approaches, the selected one of the plurality of prediction approaches having a highest accuracy;

define, for the at least one of the plurality of groups, a respective data set according to the selected one of the plurality of prediction approaches, wherein the respective data set comprises at least one attribute corresponding to at least one media item indicated as preferred for the at least one of the plurality of groups;

determine, for the at least one of the plurality of groups, respective pluralities of candidate search queries according to the respective data set based at least in part on a search history of a plurality of users in the at least one of the plurality of groups;

calculate, for individual ones of the respective pluralities of candidate search queries, a corresponding plurality of confidence scores as a function of a plurality of weighted values, the plurality of weighted values comprising a search frequency of the respective ones of the respective pluralities of candidate search queries from the search history; and before an input of any portion of a search query:
  select a predicted search query from the respective pluralities of candidate search queries based at least in part on the corresponding plurality of confidence scores; and
  encode a network page for rendering by a client device associated with the user account, the network page comprising the predicted search query.

2. The non-transitory computer-readable medium of claim 1, wherein the predicted search query is encoded to populate a search input field of the network page.

3. A system, comprising:
at least one hardware computing device; and
a prediction service executed in the at least one hardware computing device, wherein, when executed, the prediction service causes the at least one hardware computing device to at least:
  classify a user account into at least one of a plurality of groups based at least in part on at least one media consumption event associated with the user account, the at least one media consumption event comprising location data indicating a context in which at least one respective media item was consumed, the at least one of the plurality of groups comprising a plurality of user accounts;
  select one of a plurality of prediction approaches, the selected one of the plurality of prediction approaches having a highest accuracy;
  define, for the at least one of the plurality of groups, a respective data set according to the selected one of the plurality of prediction approaches, wherein the respective data set comprises at least one attribute corresponding to at least one media item indicated as preferred for the at least one of the plurality of groups;
  determine, for the at least one of the plurality of groups, a respective at least one candidate search query according to the respective data set based at least in part on a search history of a plurality of users in the at least one of the plurality of groups;
  calculate at least one respective confidence score for at least one candidate search query based at least in part on a plurality of weighted values, the plurality of weighted values comprising a search frequency of the at least one candidate search query from the search history; and
  before an input of any portion of a search query into a client device associated with the user account:
    select a predicted search query from the at least one candidate search query based at least in part on the at least one respective confidence score; and
    communicate the predicted search query to the client device.

4. The system of claim 3, wherein communicating the predicted search query to the client device further comprises encoding the predicted search query as an entry of an input field.

5. The system of claim 3, wherein the plurality of weighted values further comprise at least one of: a purchase history associated with a corresponding one of the at least one of the plurality of groups, a media consumption history associated with a corresponding one of the at least one of the plurality of groups, or an attribute of an item searchable in response to the respective at least one candidate search query.

6. The system of claim 3, wherein determining the at least one candidate search query is based at least in part on an input vector associated with the client device.

7. The system of claim 6, wherein, when executed, the prediction service further causes the at least one hardware computing device to at least:
  determine a current position of an input selector and the input vector associated with the client device;
  determine from a field of input characters, a subset of the input characters according to at least a portion of the input vector relative to the current position of the input selector; and
  limit the at least one candidate search query based at least in part on the subset of the input characters.

8. The system of claim 3, wherein:
the plurality of prediction approaches define the plurality of weighted values for the respective data set; and
the at least one respective confidence score is calculated based at least in part on the plurality of weighted values as applied to the respective data set.

9. The system of claim 3, wherein, when executed, the prediction service further causes the at least one hardware computing device to at least encode an indication of an accuracy of the prediction service based at least in part on a comparison of a submitted search query and the predicted search query.

10. The system of claim 9, wherein the indication of the accuracy is encoded as accuracy data defined with respect to the selected one of the plurality of prediction approaches, wherein the selected one of the plurality of prediction approaches is selected based at least in part on the accuracy data.

11. The system of claim 3, wherein, when executed, the prediction service further causes the at least one hardware computing device to at least select the predicted search query from the at least one candidate search query as a function of a plurality of confidence scores for individual ones of the at least one candidate search query, the plurality of confidence scores being calculated according to at least one of the plurality of prediction approaches.

12. The system of claim 3, wherein classifying the user account into the at least one of the plurality of groups comprises:
  determining at least one media preference for the user account based at least in part on the at least one media consumption event; and
  classifying the user account into the at least one of the plurality of groups according to the at least one media preference for the user account.

13. A method, comprising:

classifying, by a hardware computing device, a user account into at least one of a plurality of groups based at least in part on at least one media consumption event associated with the user account, the at least one media consumption event comprising location data indicating context in which at least one respective media item was consumed, the at least one of the plurality of groups comprising a plurality of user accounts;

selecting, by the hardware computing device, one of a plurality of prediction approaches, the selected one of the plurality of prediction approaches having a highest accuracy;

defining, by the hardware computing device, a respective data set for the at least one of the plurality of groups according to the selected one of the plurality of prediction approaches, the respective data set comprising at least one attribute corresponding to at least one media item;

determining, by the hardware computing device, at least one candidate search query for the at least one of the plurality of groups in response to a request to access a media distribution service according to the respective data set based at least in part on a search history of a plurality of users in the plurality of groups; and before an input of any portion of a search query:

selecting, by the hardware computing device, a predicted search query from the at least one candidate search query based at least in part on a plurality of weighted values, the plurality of weighted values comprising a search frequency of the at least one candidate search query from the search history; and encoding, by the hardware computing device, for rendering by a client device associated with the user account, a network page comprising the predicted search query.

14. The method of claim 13, wherein the at least one candidate search query comprises a plurality of candidate search queries, and selecting the predicted search query based at least in part on the plurality of weighted values comprises:

calculating, by the hardware computing device, a plurality of confidence scores for individual ones of the plurality of candidate search queries based at least in part on the plurality of weighted values; and selecting, by the hardware computing device, the predicted search query from the plurality of candidate search queries as a function of the plurality of confidence scores.

15. The method of claim 14, wherein selecting the predicted search query from the plurality of candidate search queries is based at least on an aggregate confidence score calculated as a function of a subset of the plurality of confidence scores corresponding to a respective one of the plurality of candidate search queries.

16. The method of claim 14, wherein selecting the predicted search query from the plurality of candidate search queries further comprises selecting the predicted search query as a one of the plurality of candidate search queries having a standard deviation with respect to others of the candidate search queries meeting a predefined threshold.

17. The method of claim 14, wherein selecting the predicted search query from the plurality of candidate search queries further comprises selecting the predicted search query as a one of the plurality of candidate search queries having a highest one of the plurality of confidence scores.

18. The method of claim 14, wherein the plurality of confidence scores are calculated as a function of a number of the plurality of candidate search queries.

19. The method of claim 13, further comprising encoding, by the hardware computing device, an indication of an accuracy of the selected one of the plurality of prediction approaches based at least in part on a comparison of a submitted search query and the predicted search query.

20. The method of claim 13, wherein the selected one of the plurality of prediction approaches is selected as a function of accuracy data corresponding to the plurality of prediction approaches.

\* \* \* \* \*